US008332315B2

(12) United States Patent
Tullis (10) Patent No.: US 8,332,315 B2
(45) Date of Patent: Dec. 11, 2012

(54) PAYMENT MESSAGE ROUTING USING GEO-LOCATION

(75) Inventor: John Tullis, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 282 days.

(21) Appl. No.: 12/729,936

(22) Filed: Mar. 23, 2010

(65) Prior Publication Data

US 2011/0137796 A1    Jun. 9, 2011

Related U.S. Application Data

(60) Provisional application No. 61/286,155, filed on Dec. 14, 2009, provisional application No. 61/267,586, filed on Dec. 8, 2009.

(51) Int. Cl.
*G06Q 40/00* (2012.01)

(52) U.S. Cl. ....... 705/39; 705/35; 455/456.1; 455/456.2

(58) Field of Classification Search .................... 705/35, 705/39, 44
See application file for complete search history.

(56) References Cited

U.S. PATENT DOCUMENTS

| 7,258,268 | B2 | 8/2007 | Steiger, Jr. |
| 7,356,505 | B2 | 4/2008 | March |
| 7,461,776 | B2 | 12/2008 | Steiger, Jr. |
| 2002/0016763 | A1 | 2/2002 | March |
| 2005/0119969 | A1 | 6/2005 | Michelsen et al. |
| 2005/0177496 | A1* | 8/2005 | Blagg et al. ................ 705/39 |
| 2008/0033877 | A1 | 2/2008 | Blair et al. |
| 2008/0140568 | A1 | 6/2008 | Henry |
| 2008/0243690 | A1 | 10/2008 | Paintin et al. |
| 2008/0249909 | A1* | 10/2008 | Lorberg et al. ............ 705/35 |
| 2008/0288401 | A1 | 11/2008 | Jones et al. |
| 2009/0061831 | A1 | 3/2009 | Shastry |
| 2009/0106149 | A1 | 4/2009 | Bennett et al. |
| 2009/0106152 | A1 | 4/2009 | Dill et al. |
| 2009/0164367 | A1 | 6/2009 | Henoch |

FOREIGN PATENT DOCUMENTS

| EP | 1783676 A1 | 5/2007 |
| JP | 2001-307178 A | 4/2000 |
| WO | WO 01/71831 A2 | 6/2011 |

OTHER PUBLICATIONS

International Search Report and Written Opinion for PCT Patent Application No. PCT/US2010/059112 mailed on Aug. 4, 2011, 9 pages.
International Preliminary Report on Patentability for PCT Application No. PCT/US2010/059122, mailed on Jun. 21, 2012, 6 pages.

\* cited by examiner

*Primary Examiner* — Elizabeth Rosen
(74) *Attorney, Agent, or Firm* — Kilpatrick, Townsend & Stockton LLP (57) ABSTRACT

Methods and system for enabling safe and efficient money transfer between a sender and a beneficiary are provided. The method includes communicating with a beneficiary's mobile device to ascertain the beneficiary's current geo-location. Based on the geo-location and funds at hand, one or more receiving agents are selected to fulfill the transfer. The beneficiary is offered a choice of agents and the selected agent is provided with the money transfer details to complete the transfer.

22 Claims, 10 Drawing Sheets

| Agent # | Location (GPS Coordinates) | Funds at Hand |
|---|---|---|
| 1 | 05/30/1999 14:46:08<br>47°11.839' -120°57.156' | $ 400 |
| 2 | 05/30/1999 17:26:11<br>30°40.104' -78°26.313' | $ 3000 |
| 3 | 05/30/1999 12:16:12<br>39°35.559' -78°36.404' | $ 100 |
| 4 | 05/30/1999 01:10:32<br>18°55.559' -72°54.404' | $ 12,000 |
| ⋮ | ⋮ | ⋮ |
| N | 05/30/1999 04:36:02<br>40°13' -124 30' | $ 750 |

PAYMENT MESSAGE ROUTING USING GEO-LOCATION

CROSS-REFERENCES TO RELATED APPLICATIONS

The present application claims benefit under 35 U.S.C. §119(e) of U.S. Provisional Patent Application No. 61/286,155, entitled "Payment Message Routing Using Geo-Location", filed Dec. 14, 2009, and U.S. Provisional Patent Application No. 61/267,586, entitled "Trust System Using Geo-Location", filed Dec. 8, 2009, the contents of which are hereby incorporated by reference in their entirety for all purposes.

BACKGROUND

One of the quickest ways to send money from one person to another is using direct money transfer or wire transfer. Direct money transfer has been in use for several decades throughout the world. In a conventional direct money transfer process, person A deposits money, usually in cash, with a money transfer agency, e.g., Western Union, and provides the details of a beneficiary person B to the money transfer agency. The money transfer agency generates a unique number that identifies the particular transaction and provides that number to person A. Person A then provides the unique number to person B and informs person B about the pending transfer. Person B can then visit a branch of the money transfer agency at his location and present the unique number to collect the money, usually within a few hours. The money transfer agency does the settlement process internally and charges a percentage of the money transferred as its fees. If person B does not pick up the money within a specified time, the money may be escheated to the money transfer agency or to the state depending on the law.

Although convenient, the conventional money transfer system has various disadvantages. First, person A has to call/inform person B about the money being sent and provide the unique number to person B. Second, person B has to locate a money transfer agency branch closest to him and check with that branch if he can collect the money from that branch. If the closest branch is far away from person B's location, the time gained by using direct money transfer may be lost because of the time required to collect the money. Third, if the unique number is lost, there may be no way of collecting the money. Fourth, if the unique number is stolen, there is a possibility that anyone can collect the money.

What is needed is a more robust and convenient way for transferring money that will aid fraud mitigation and prevent escheatment.

SUMMARY

Embodiments of the present invention relate to methods and system for transferring funds between a sender and a beneficiary.

In some embodiments, the method for transferring funds comprises receiving information about a beneficiary's mobile device and information about a funds transfer operation. The information about the funds transfer operation can include a claim identification (ID) number. Upon receipt of the information about the funds transfer operation, the method further includes contacting the beneficiary's mobile device to determine a location of the beneficiary followed by determining one or more agents who can fulfill the claim based at least in part on the location of the beneficiary. The method further includes sending information about the one or more agents to the beneficiary's mobile device and receiving input from the beneficiary's mobile device indicating selection by the beneficiary of an agent from the one or more agents.

In some embodiments, the location of the beneficiary is determined using a global positioning system (GPS) signal or by using cellular phone tower triangulation technique. In some embodiments, the method includes periodically contacting the one or more agents to determine their current location and information about available funds at hand, and updating a database with the current location and information about available funds at hand of the one or more agents. In some embodiments, the method includes querying the database to determine the location of the one or more agents, comparing the location of the beneficiary with the location of the one or more agents, selecting one or more agents whose location is in close proximity to the beneficiary, and sending the information about the selected one or more agents to the beneficiary's mobile device.

In some embodiments, a method for transferring money to a beneficiary is provided. The method comprises receiving information about a beneficiary, which includes information about a mobile communication device of the beneficiary. Thereafter, the method includes contacting the mobile communication device to request a current location of the mobile communication device and receiving the current location of the mobile communication device. Based on the current location of the mobile communication device, searching a database including information about location of one or more agents and selecting one or more agents based on the location of the one or more agents. Once identified, the method further includes communicating the information about the selected one or more agents to the mobile communication device and receiving input from the mobile communication device indicating selection of an agent, by the beneficiary, from among the selected one or more agents. Lastly, the method includes communicating payment information to the selected agent, where the payment information includes a claim number and an amount of payment.

Certain embodiments of the present invention provide a system for transferring funds to a beneficiary. The system comprises a transmitting agent configured to accept funds from a sender and generate a claim identification number, a receiving agent for disbursing the funds to the beneficiary, and a transaction server. The transaction server is configured to receive information about a mobile communication device of the beneficiary and information about the funds transfer including the claim identification number, communicate with the mobile communication device to determine a current location of the beneficiary, select one or more agents from an agent database who can fulfill the funds transfer to the beneficiary, send the information about the one or more agents to the mobile communication device, receive input from the mobile communication device indicating selection of the receiving agent, from among the one or more agents, by the beneficiary, and send the information about the funds transfer including the claim number to the receiving agent. In some embodiments, the current geo-location of the beneficiary is determined using cellular tower triangulation.

In some embodiments, another method of transferring money is provided. This method includes receiving information about funds to be transferred and information about a mobile communication device of the beneficiary, communicating with the mobile communication device of the beneficiary to request a current geo-location of the beneficiary, selecting a receiving agent, from among a plurality of receiving agents, to provide transfer the funds to the beneficiary based at least in part on the current geo-location of the beneficiary, communicating with the selected receiving agent to request an attribute associated with the selected receiving agent, and communicating the attribute associated with the selected receiving agent to the mobile communication device of the beneficiary. In some embodiments, selecting a receiving agent comprises searching a database to determine an agent who is in close proximity to the beneficiary based on the geo-location of the beneficiary and who has sufficient funds on hand to complete the funds transfer. In some embodiments, the attribute includes one of a physical attribute of the receiving agent, location attribute, a password, or a challenge-response.

The following detailed description, together with the accompanying drawings will provide a better understanding of the nature and advantages of the present invention. These and other problems are addressed by embodiments of the invention, individually and collectively.

DETAILED DESCRIPTION

Certain embodiments of the present invention provide a system and method for transferring funds to a beneficiary. The term "funds" typically refers to currency (e.g., U.S. dollars, Japanese yen, etc.), but can be other forms of tender.

In some embodiments, a transaction server can receive information about a funds transfer from a transmitting agent. The funds transfer information may include information about a mobile communication device of the funds beneficiary. Upon receiving this information, the transaction server may contact the beneficiary's mobile communication device and request a current geo-location of the mobile communication device. The mobile communication device can send its current geo-location to the transaction server in form of GPS coordinates, cellular phone tower triangulation data, or wireless access points location data. After receipt of the geo-location information, the transaction server can search an agent database to determine an agent who is in close proximity to the beneficiary and send that information to the beneficiary's mobile communication device. The beneficiary can then indicate his selection of the agent to the transaction server. The transaction server can then send the funds transfer information to the selected agent.

Figure 1:
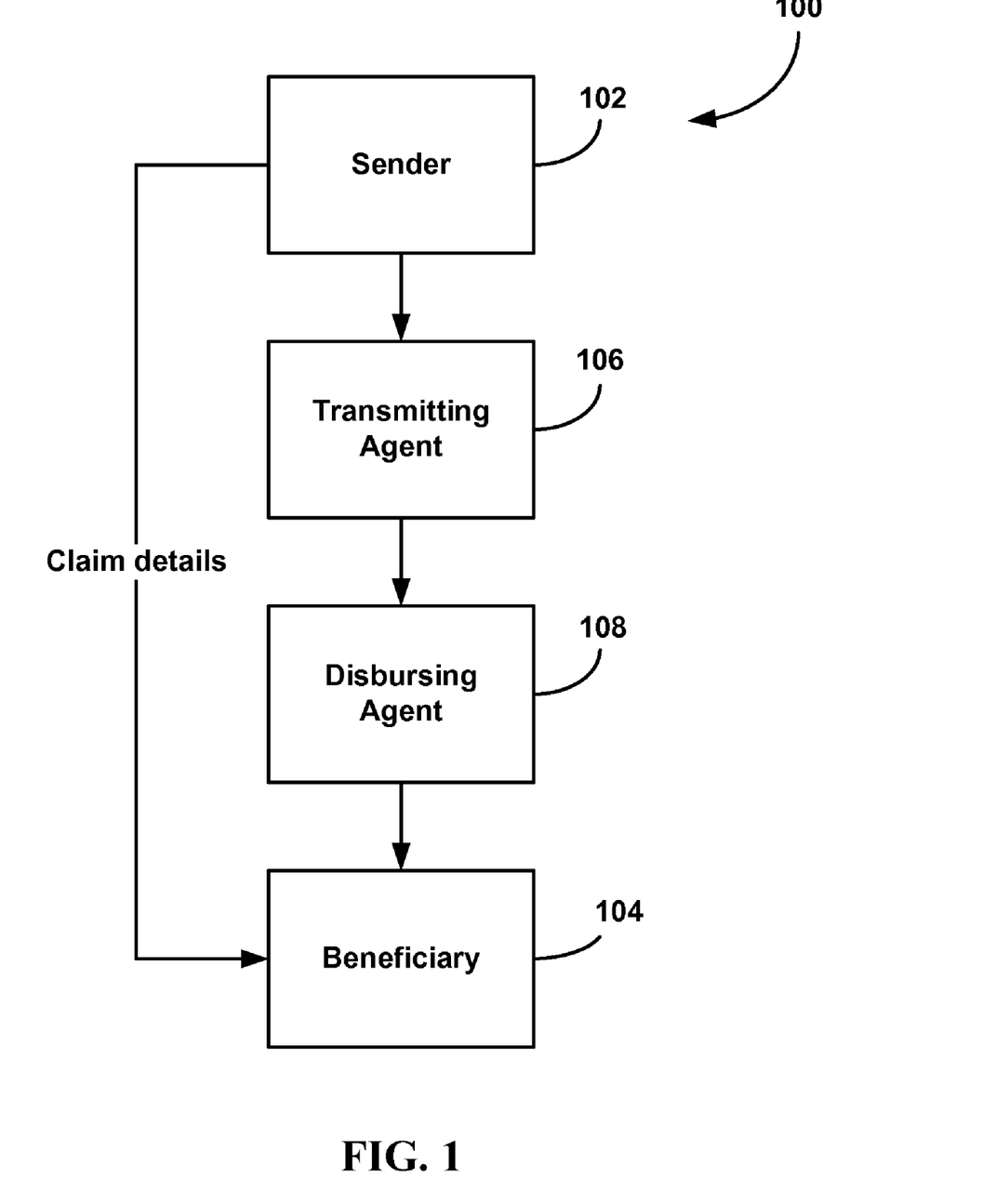
FIG. 1 illustrates a conventional method of transferring money between a sender and a beneficiary.

FIG. 1 illustrates a conventional method of transferring money between a sender and a beneficiary. In the conventional method of money transfer, a sender 102 deposits the desired amount of money to be transferred to a beneficiary 104 plus any additional service fees, with a transmitting agent 106, e.g., Western Union. The transmitting agent 106 accepts the money and generates a claim number associated with the transfer. The sender 102 also provides the beneficiary details such as, the beneficiary's name and contact information, to the transmitting agent 106. The transmitting agent 106 may have several locations throughout the country of operation or may have contracted agents working on behalf of the transmitting agent 106 that can accept or disburse money.

Once the transmitting agent 106 receives the money from the sender 102 and generates a claim number that claim number is provided to the sender 102. The sender then provides the claim number and the transmitting agent name to the beneficiary 104. The beneficiary 104 then visits a local receiving/disbursement agent 108 associated with the transmitting agent 106 and presents the claim number. The disbursement agent then locates the claim details in a centralized system, verifies the beneficiary's identity, and disburses the funds to the beneficiary. At the end of the day or some other suitable period of time, the transmitting agent 106 and the disbursement agent 108 may reconcile the amount disbursed using an internal settlement process.

The conventional system described above has several disadvantages. First, the sender 102 has to communicate the claim number to the beneficiary 104. Second, the beneficiary 104 has to locate a disbursing agent 108 closest to his location. Often, in developing countries where the financial infrastructure is poor, the nearest disbursing agent could be located miles away from the beneficiary's location. This makes it very inconvenient for the beneficiary 104 to collect the money. Third, the beneficiary 104 has to contact the disbursing agent 108 to determine the working hours of the disbursing agent 108 and whether the disbursing agent 108 has enough cash to fulfill the claim. Depending on the location, the beneficiary 104 may have to contact several agents or agent locations to determine which agent can fulfill the funds transfer. This is very inconvenient for the sender 102 and the beneficiary 104 and certain advantages gained by fast transfer of funds may be lost due to delay of actually getting the money into the hands of the beneficiary 104.

Money Transfer Using Geo-Location

Embodiments of the present invention eliminate most of the disadvantages associated with conventional money transfer systems and issues associated with locating a mobile agent.

Figure 2:
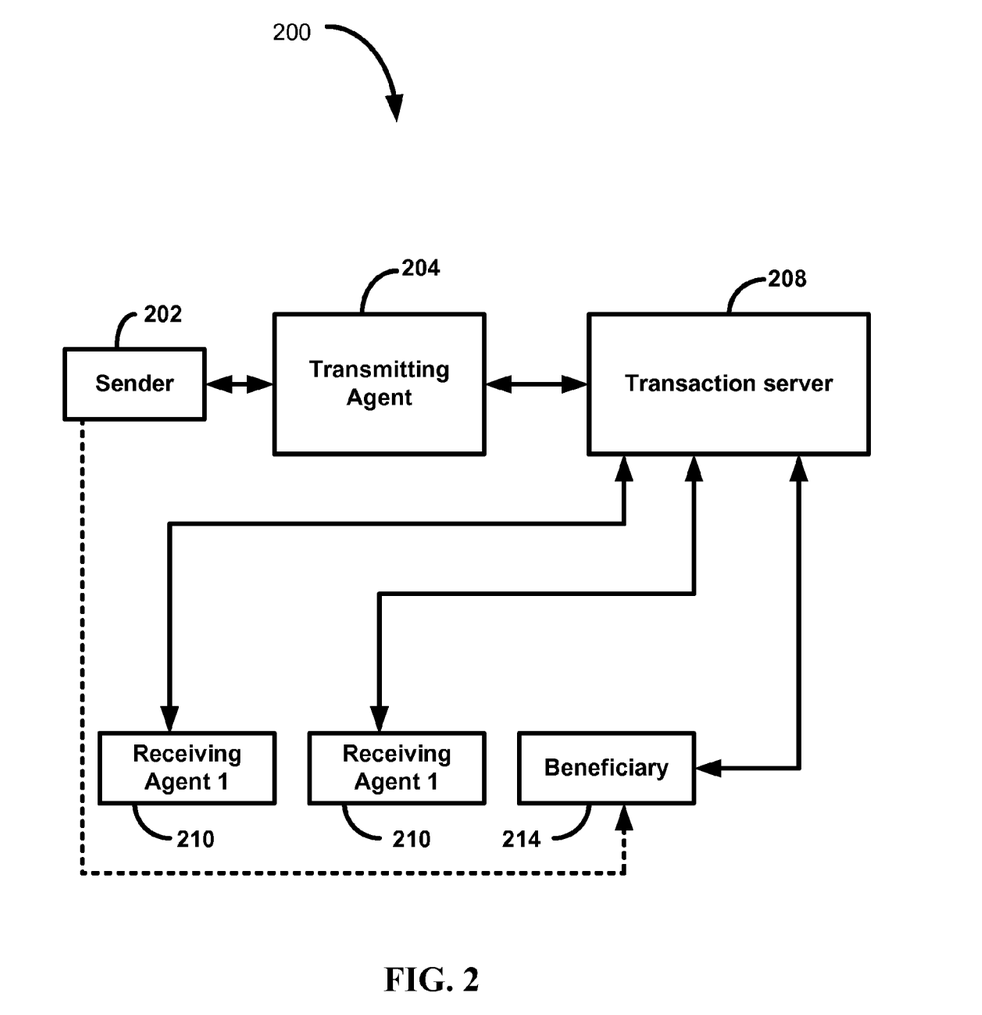
FIG. 2 illustrates a system for transferring funds from the sender to a beneficiary according to an embodiment of the present invention.

FIG. 2 illustrates a system 200 for transferring funds from the sender to a beneficiary according to an embodiment of the present invention. System 200 includes a sender 202, a transmitting agent 204, a transaction server 208, one or more receiving agents 210, and a beneficiary 214.

The sender 202 is any person or entity that wants to send funds to the beneficiary 214. The sender can deposit the amount of funds he wishes to send to the beneficiary 214, with the transmitting agent 204. The funds may be deposited with the transmitting agent 214 in the form of cash, using a debit or credit card, via check, etc. The transmitting agent 204 accepts the deposited funds and generates funds transfer documentation associated with the funds transfer. In some embodiments, the funds transfer documentation can include a claim identification number associated with the money transfer request and other relevant information. In other embodiments, the sender 202 may specify that certain 'shared-secret' information be included as part of the funds transfer documentation. Such shared-secret information may only be known to the sender 202 and the beneficiary 214. Examples of shared-secret information include a code phrase, a response to a challenge question, a code word, a piece of identifying information of the sender 202 and/or the beneficiary 214, or the amount of funds being transferred to the beneficiary 214.

Transmitting agent 204 can be an entity that provides money transfer facility to the general public, e.g., Western Union, or an entity or individual contracted by one or more financial institutions to transfer money on behalf of the members of the one or more financial institutions. In some embodiments, a money transfer entity may have a brick-and-mortar location for depositing and/or collecting the funds. In some embodiments, a transmitting agent can also act as a receiving agent and vice versa. The sender usually provides information about the beneficiary, such as, name, address, etc. In some embodiments, the sender 202 may also provide the beneficiary's mobile communication device, e.g., a cellular phone, information to the transmitting agent 204.

The claim documentation generated by the transmitting agent 204 can include a unique claim identification number. This unique claim identification number may be required to collect the funds from the receiving agent 210. Once the transmitting agent 204 generates the claim documentation, the claim documentation along with the information about the beneficiary's mobile communication device is sent to a transaction server 208.

The transaction server 208 can be a central server located at a central location. Alternatively, the transaction server 208 may be located at the transmitting agent location. The transaction server/payment processing system 208 is capable of communicating with several transmitting and receiving agents. In the event that the sender 202 deposits cash with the transmitting agent 204, the claim information along with the beneficiary information is sent to the transaction server 208 by the transmitting agent 204. For example, the transmitting agent 204 may send the claim information and the beneficiary information to the transaction server 208 over a secure wired or wireless connection.

In the event that the sender 202 used a payment card such as a debit or credit card, to deposit the money with the transmitting agent 204, the information about the claim can be automatically received by the transaction processor 208 via typical credit card processing mechanisms. In such instance, transaction server 208 may also serve as a payment processing entity for facilitating the payment card transaction. For example a payment processing system such as VisaNet may be used to facilitate communication of an authentication request and other authorization messages between a payment card reader located at the transmitting agent 204 and an issuer of the payment card, using conventionally known credit card transaction processing. Details of the transaction server 208 are described in relation to FIG. 3 below.

The system 200 further includes one or more receiving agents 210. Receiving agents 210 are similar to the transmitting agent 204 in that they can also function as a transmitting agent. The receiving agent 210 can either be a brick-and-mortar location or an individual who can travel within a designated area to receive or disburse funds. In some embodiments, the transmitting agent 204 and the receiving agent 210 can communicate with the transaction processor 208 to provide information about their location and funds at hand status.

The phrase "funds at hand" refers to the amount of funds available for disbursement held by an agent.

In some embodiments, in order to fulfill a claim, the beneficiary may contact the receiving agent and present the claim information and some form of identification, The receiving agent may then verify the claim information and beneficiary identification and disburse the funds. In some embodiments, the sender may additionally specify a particular form of identification that the beneficiary may need to present prior to receiving the funds. For example, the sender may specify that the beneficiary provide a response to a challenge question that only the real beneficiary would know, e.g., beneficiary's place of birth. This may prevent someone other than the beneficiary from impersonating the beneficiary even in the case when the beneficiary's mobile communication device is lost or stolen or the message from the transaction server is intercepted by someone other than the beneficiary.

It should be noted that although system 200 is described using particular blocks, the system 200 is not limited to the illustrated blocks. One skilled in the art will realize that system 200 may include more or less components than the ones illustrated depending on a particular embodiment.

Figure 3:
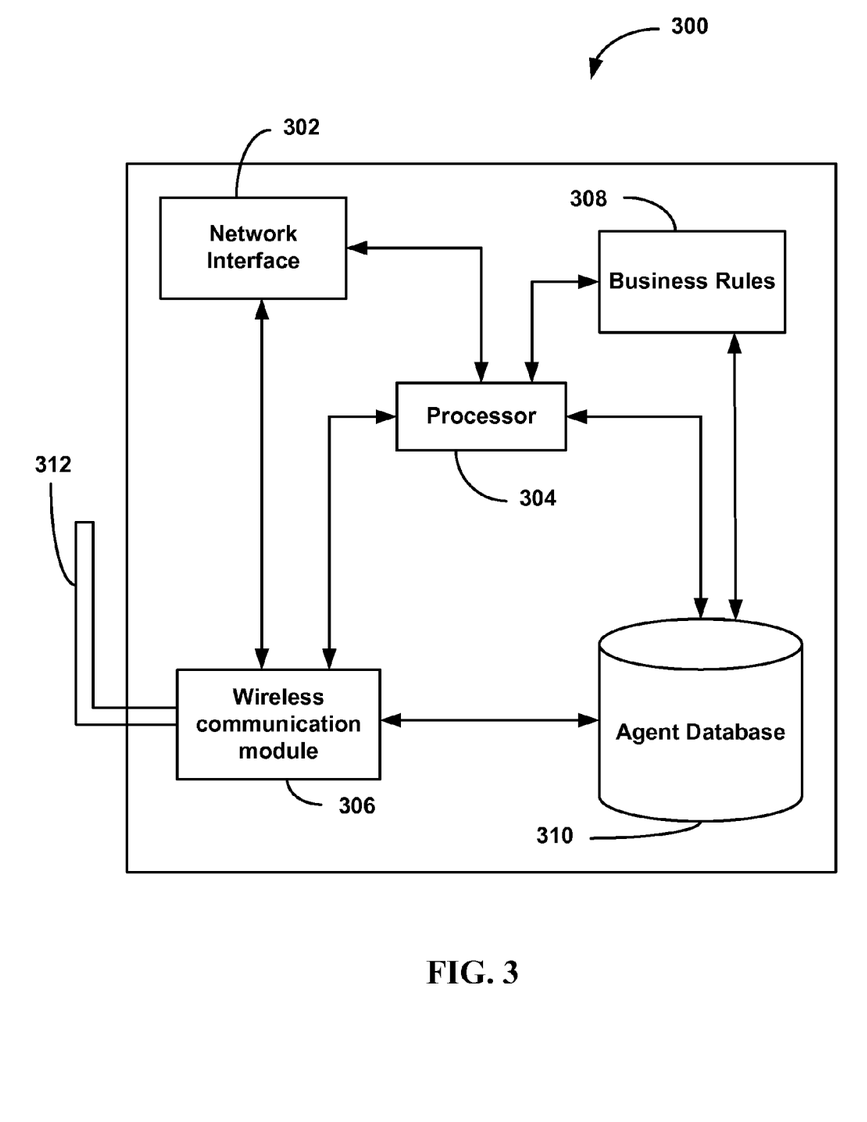
FIG. 3 illustrates a block diagram of a transaction server according to an embodiment of the present invention.

As described above, the transaction server 208 maintains a record of the location and funds at hand for the transmitting agent 202 and receiving agent 210. FIG. 3 illustrates a block diagram of a transaction server 300 according to an embodiment of the present invention. The transaction server 300 comprises a network interface 302, a processor 304, a wireless communication module 306, a business rule engine 308 and an agent database 310, and antenna 312.

The network interface 302 can communicate with an external system such as a payment processing system. In some embodiments network interface 302 can provide wired network connectivity (e.g., Ethernet) in addition to or instead of a wireless interface. The network interface 302 can be implemented using a combination of hardware (e.g., antennas, modulators/demodulators, encoders/decoders, and other analog and/or digital signal processing circuits) and software components.

The processor 304, which can be implemented as one or more integrated circuits (e.g., a conventional microprocessor or microcontroller), can control the operation of the transaction server 300. For example, in response to receiving information about a beneficiary's mobile communication device, processor 304 can instruct the wireless communication module 306 to communicate with the beneficiary's mobile communication device to request a current location of the mobile communication device.

The wireless communication module 306 can be used to communicate with the transmitting agent and the receiving agent. In some embodiments, the wireless communication module 306 can include radio frequency (RF) transceiver components for accessing wireless voice and/or data networks (e.g., using cellular telephone technology, advanced data network technology such as 3G or EDGE, WiFi (IEEE 802.11 family standards), or other mobile communication technologies, or any combination thereof), GPS receiver components, and/or other components. In some embodiments, the wireless communication module 306 and the network interface 302 can be combined into a single module. In some embodiments, the wireless module can include an external antenna 312 for communicating the signals to and receiving the signals from other wireless device such as, a cellular phone.

The business rule engine 308 provides the various rules and criteria for selecting one or more agents for disbursing the funds. In some embodiments, the business rule engine 308 comprises information detailing the criteria for choosing an agent for disbursement based on the distance of the agent from the beneficiary and available funds at hand with the agent. In some embodiments, where the transaction server 300 is configured to work with multiple financial institutions for transferring funds, the business rule engine 308 may also store rules and criteria for the multiple financial institutions and provide the appropriate rule to the processor 304 for determining one or more agents to be presented to the beneficiary.

The agent database 310 can store information about the transmitting agent and the receiving agent. In some embodiments, the agent database 310 stores information about an agent's current location and funds at hand status. In some embodiments, the transaction server 300 periodically communicates with a mobile communication device of the transmitting agent and/or the receiving agent via the wireless communication module 306 and request location updates and information about funds at hand from the transmitting agent and receiving agent. The transaction server 310 periodically updates the agent database 310 with the most current location and funds at hand information for the transmitting agent and the receiving agent. In some embodiments, the agent database 310 also stores information about the one or more claims being processed by each agent. For example, when the transmitting agent receives money from the sender and generates claim documentation, the transaction server 310 can store this information in the agent database 310. The claim information can later be used to determine if a particular agent can fulfill a money transfer request.

The agent database 310 can be implemented using any computer readable non-transitory storage medium, e.g., disk, flash memory, or any other nonvolatile storage medium. In some embodiments, the agent database 310 can also store programs and applications for calculating the distance between the receiving agent and the beneficiary based on the GPS coordinates (or any other location coordinates) received for the beneficiary and the receiving agent. In some embodiments, the agent database can be a repository of historical information about transaction history of the transmitting and receiving agents. In some embodiments, the agent database 310 may be located external to the transaction server 300 and may be communicably coupled to the transaction server 300.

It is to be noted that while the transaction server is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Figure 4:
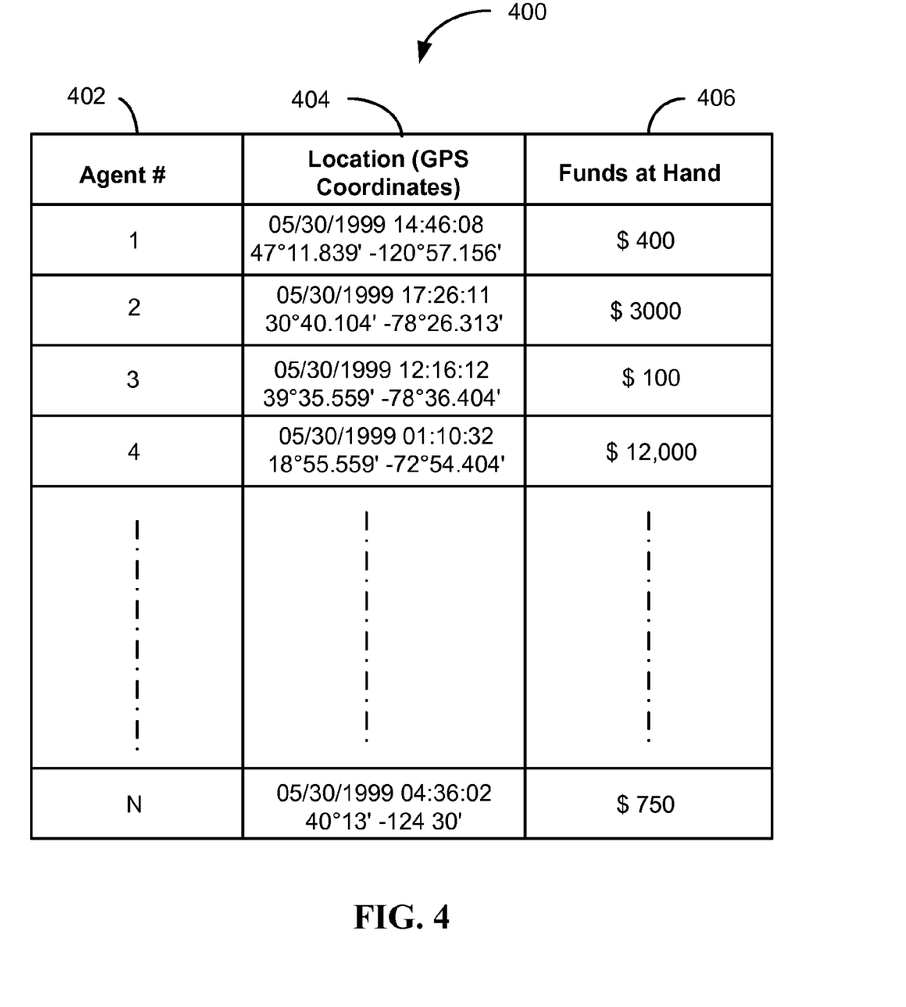
FIG. 4 illustrates a table including agent information that may be stored in an agent database resident in the transaction server according to an embodiment of the present invention.

As described above, the agent database 310 stores information about the agents. The information about the agents may include their current location, the funds at hand for each agent, and any other relevant information that might be helpful in determining an appropriate agent for disbursing money to the beneficiary. FIG. 4 illustrates table 400 that includes agent information, which may be stored in the agent database 310 according to an embodiment of the present invention.

As illustrated in FIG. 4, the table 400 comprises information about multiple agents. The table 400 comprises an agent field 402 that lists the various agents that are connected to the transaction server. Field 404 lists the location of each of the agent including the time the location information was last updated. Table 400 illustrates GPS coordinates; however, the embodiments of the present invention are not limited to GPS coordinates only. Other types of location information, e.g., using cellular tower triangulation, proximity to one or more wireless access points, postal address, etc. may also be used in conjunction with or lieu of GPS coordinates. Field 406 lists the available funds at hand for each of the agent. In some embodiments, this information is updated periodically, e.g., daily or hourly, to ensure that most current information is always available. In order to update the information in table 400, the transaction server 300 may periodically poll a mobile communication device of the agents and request the location and funds at hand information. Alternatively, the mobile communication device of the agents may be configured to send this information periodically to the transaction server without a request from the transaction server. Table 400 illustrates some of the information that may be stored in the agent database 310. It is to be understood that the information illustrated in table 400 is not exhaustive and other types of information in addition to or in lieu of the information illustrated in table 400 may be stored in the agent database. For example, agent database 310 can also include information about each agent's mobile phone and the agent's most current location based on cellular phone tower triangulation technique.

Figure 5:
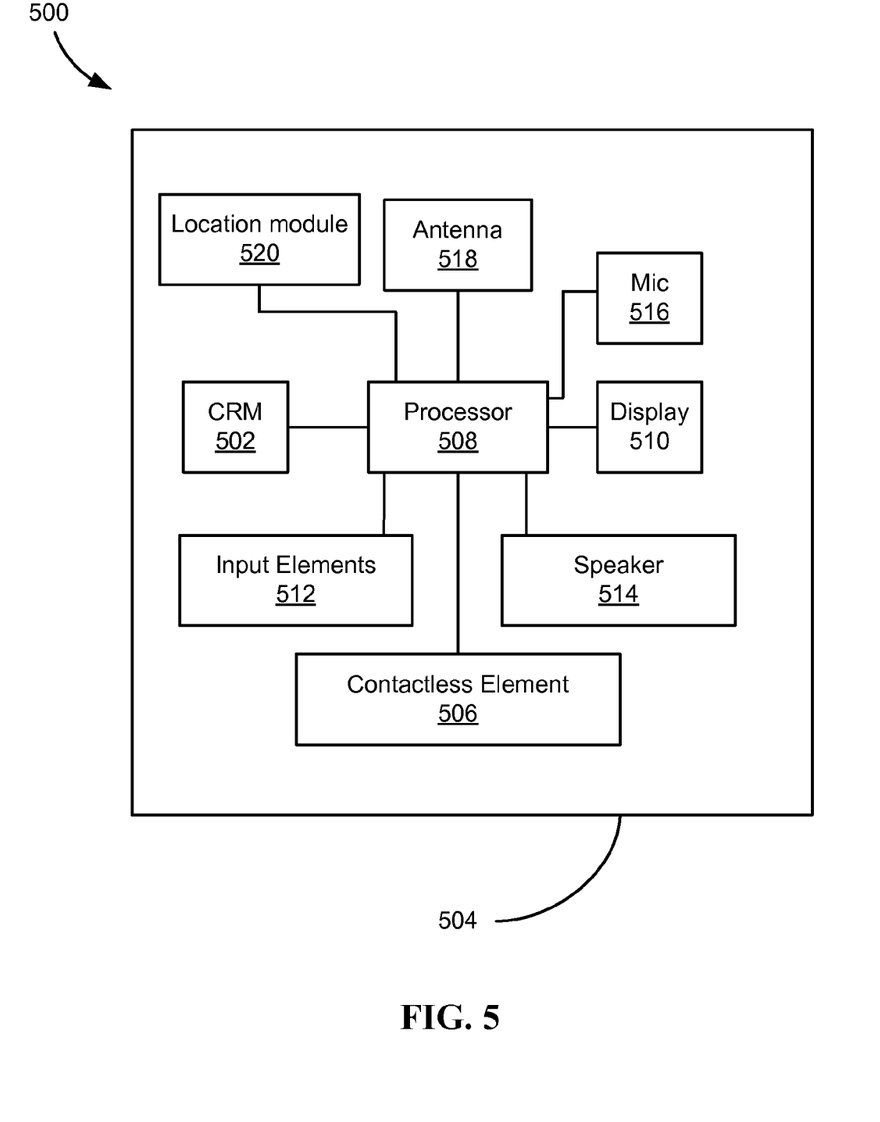
FIG. 5 is a block diagram of a mobile communication device that may be used by the beneficiary and/or the agent to communicate with the transaction server according to an embodiment of the present invention.

FIG. 5 illustrates a mobile communication device 500 that may be used by the beneficiary or the agent to communicate with the transaction server according to an embodiment of the present invention. The beneficiary may use the mobile communication device 500 for sharing his geo-location with the transaction server and receiving communications from the transaction server, e.g., the transaction server 300 illustrated in FIG. 3. The transmitting and receiving agents may use the mobile communication device 500 for communicating their geo-location and funds at hand information to the transaction server.

The mobile communication device illustrated in FIG. 5 illustrates only a specific number of components for simplicity. However, it is understood that in other embodiments of the invention, there can be many more components or fewer components. The mobile communication device 500 may comprise a computer readable medium 502 and a body 504. The computer readable medium 502 may be present within body 504, or may be detachable from it. The body 504 may be in the form of a plastic substrate, housing, or other structure. The computer readable medium 502 may be a non-volatile memory that stores data and may be in any suitable form including a magnetic stripe, a memory chip, etc. The memory may store information such as financial information. Financial information may include information such as bank account information, bank identification number (BIN), credit or debit card information, account balance information, expiration date, consumer information such as name, date of birth, etc. Any of this information may be transmitted by the mobile communication device 500.

The computer readable medium 502 may comprise code for performing functions according to embodiments of the invention.

The mobile communication device 500 may further include a contactless element 506, which is typically implemented in the form of a semiconductor chip (or other data storage element) with an associated wireless transfer (e.g., data transmission) element, such as an antenna. Contactless element 506 is associated with (e.g., embedded within) the mobile communication device 500 and data or control instructions transmitted via a cellular network may be applied to contactless element 506 by means of a contactless element interface (not shown). The contactless element interface functions to permit the exchange of data and/or control instructions between the mobile device circuitry (and hence the cellular network) and an optional contactless element 506.

Contactless element 506 is capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as Radio Frequency Identifier (RFID), Bluetooth™, infra-red, or other data transfer capability that can be used to exchange data between the mobile communication device 500, a transaction server, e.g., transaction server 300 of FIG. 3, and an agent, e.g., transmitting agent 202 or receiving agent 210 of FIG. 2. Thus, the mobile communication device 500 is capable of communicating and transferring data and/or control instructions via both cellular network and near field communications capability.

The mobile communication device 500 may also include a processor 508 (e.g., a microprocessor) for processing the functions of the mobile communication device 500 and a display 510 to allow a consumer to see phone numbers, graphics, and other information and messages. The mobile communication device 500 may further include input elements 512 to allow a consumer to input information into the device, a speaker 514 to allow the consumer to hear voice communication, music, etc., and a microphone 516 to allow the consumer to transmit his or her voice through the mobile communication device 500. The mobile communication device 500 may also include an antenna 518 for wireless data transfer (e.g., data transmission).

In some embodiments, the mobile communication device may include a location module 520. The location module 520 can be capable of determining a location of the mobile communication device. In some embodiments, the location module may include a global positioning system (GPS) transceiver that can determine the GPS coordinates of the mobile communication device and communicate those coordinates to the transaction server via the antenna 518. In some embodiments, the communications module can include a WiFi transceiver that is able to determine the position of the mobile communication device using information about nearby wireless access points. In other embodiments, the communication module 520 can determine the location of the mobile communication device using cellular phone triangulation technique. This technique is well-known in the art and the discussion of this technique is omitted here for consciences. In some embodiments, upon a request from the transaction server, the location module 520 may determine a location for the mobile communication device using any of the techniques described above and communicate the location information to the transaction server.

It is to be noted that while the mobile communication device 500 is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the mobile communication device can be realized in a variety of devices including electronic devices implemented using any combination of circuitry and software. Mobile communication device 500 can be implemented using e.g., a mobile phone, a person digital assistant (PDA), a wireless access device, or a portable media player with communication capability.

Figure 6:
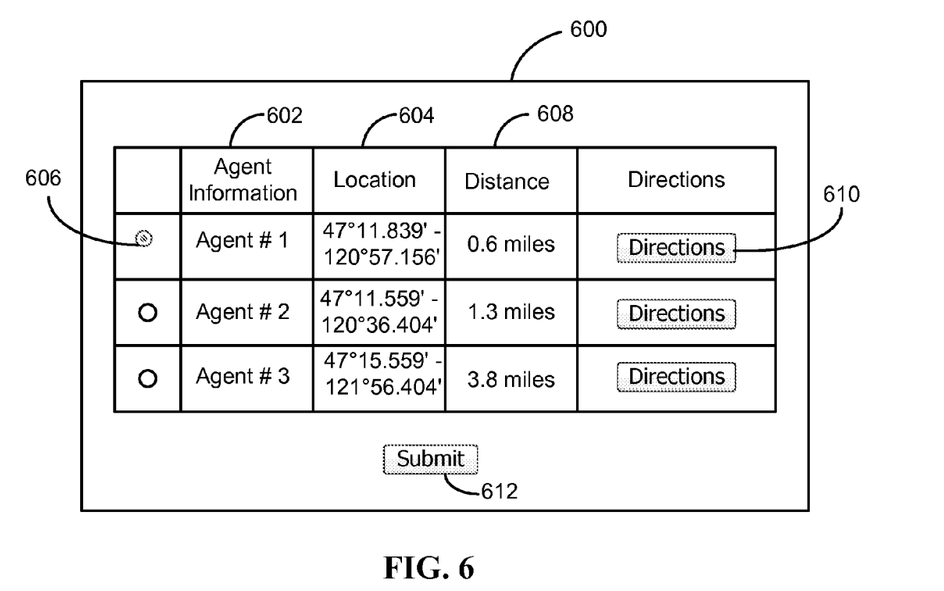
FIG. 6 illustrates a sample screen that may be displayed on the beneficiary's mobile communication device according to an embodiment of the present invention.

FIG. 6 shows a sample screen 600 that may be displayed on the beneficiary's mobile communication device according to an embodiment of the present invention. In some embodiments, the sample screen 600 may include information about one or more agents 602, the location of each agent 604, an agent selection button 606 and a distance 608 of each agent from the current location of the beneficiary. In some embodiments, the sample screen 600 may also provide the beneficiary with an option to get the directions to the location of each of the agents from the beneficiary's current location. In such an instance, the beneficiary may select a direction button 610 in order to get directions to the selected agent. In some embodiments, once the beneficiary selects an agent using the selection button 606, he can select a submit button 612 in order to communicate his selection to the transaction processor. It is to be understood that the information shown in the sample screen 600 is for illustrative purposes only. One skilled in the art will realize that additional information in lieu of or in addition to the information shown may be presented on screen 600. In some embodiments, the user may have to scroll through several screens to see the complete list of agents.

Figure 7:
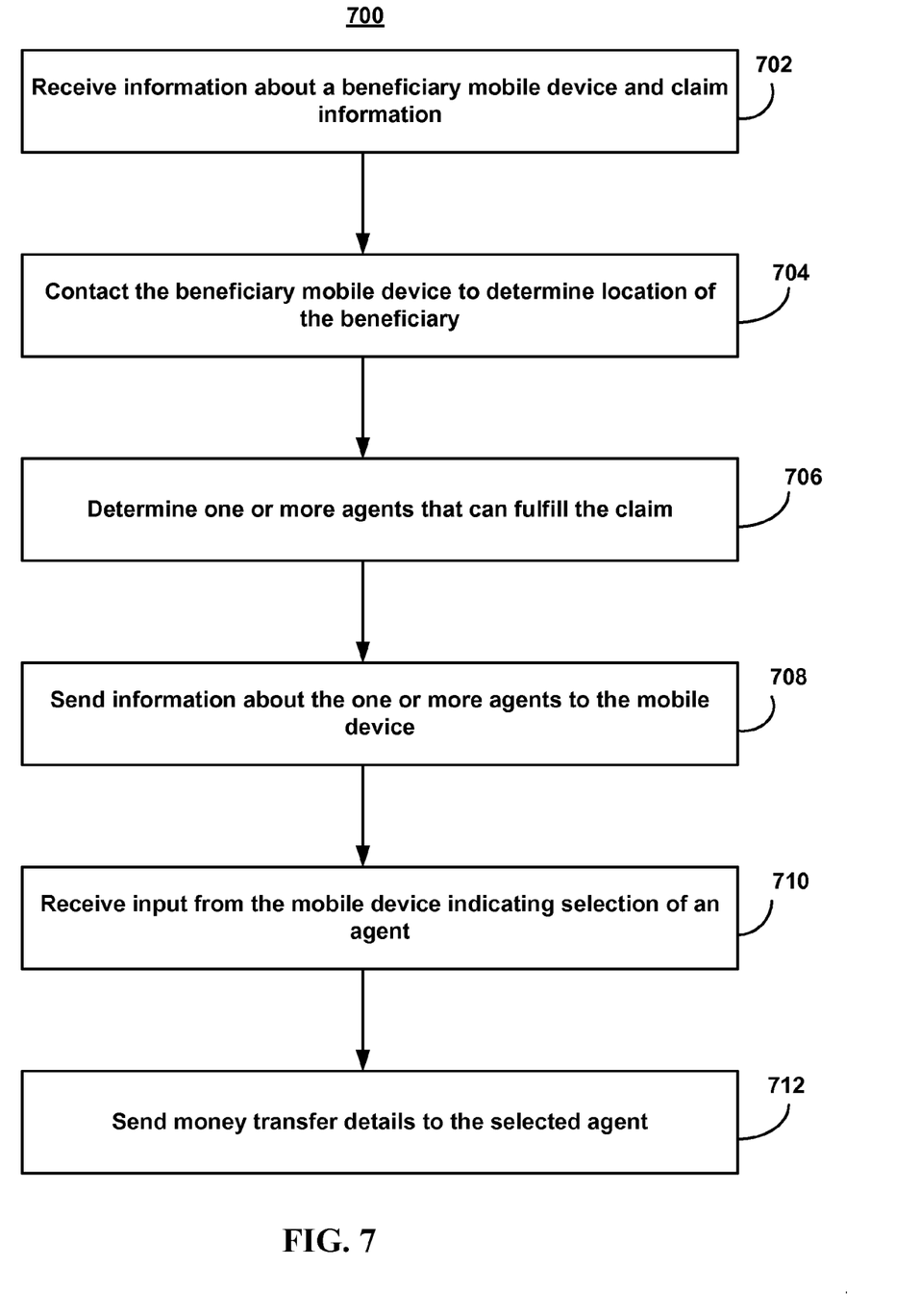
FIG. 7 is a flow diagram of a process for transferring funds between a sender and beneficiary according to an embodiment of the present invention.

As described above, the transaction server interacts with the transmitting agent, the receiving agent, and the beneficiary to relay communications among them to facilitate the efficient transfer of funds between the sender and the beneficiary. FIG. 7 is a flow diagram of a process 700 for transferring funds between a sender and beneficiary according to an embodiment of the present invention.

At step 702, the transaction server receives information about a funds transfer operation. The information can include a claim identification number and information about a funds transfer beneficiary's mobile communication device. Once the transaction server receives the information about the funds transfer, the transaction server communicates with the beneficiary's mobile communication device at step 704. The transaction server may request the beneficiary's mobile communication device to communicate location information of the beneficiary's mobile communication device thereby communicating the beneficiary's location. The beneficiary's mobile communication device may respond to the transaction server and provide its location information. As described above, the location information may be determined using any of the techniques mentioned above. For example, if the beneficiary's mobile communication device includes a GPS device, the beneficiary's mobile communication device may determine and communicate its GPS coordinates to the transaction server. If no GPS device is available, the beneficiary's location may be determined using cellular phone tower triangulation technique, location of nearby wireless hotspots, or any other technique suitable for determining location. For example, In the cellular phone tower triangulation method, the cellular signal emitted by the mobile communication device is tracked and the location of the mobile communication device is determined based on the signal strength to nearby cellular towers. In some embodiments, the location may be determined using information about the nearby wireless access points.

Once the transaction server determines the location of the beneficiary, it searches the agent database to determine the location of the agents that are closest to the beneficiary at step 706. As described earlier, the agent database is periodically updated to include the most current location information for the agents, especially, the mobile agents. In some embodiments, the transaction server compares the location of the beneficiary to the location of one or more agents and determines a distance between the beneficiary and one or more agents. In some embodiments, the transaction server may assign a priority ranking to the one or more agents based on the distance of the one or more agents from the beneficiary. In addition, in some embodiments, the transaction server also searches the agent database to determine the funds at hand for each agent and compares that to the information received from the transmitting agent to determine which agents can fulfill the funds transfer; i.e., those agents who have sufficient funds to give to the beneficiary. In some embodiments, the location of agents may be determined prior to determining which agents have enough funds to fulfill a claim. In other embodiments, the system may first determine which agent or agents have enough funds to fulfill the claim and then determine the distance of only those agents from the beneficiary's location.

At step 708, the transaction server sends the information about one or more agents determined in step 706 to the beneficiary's mobile communication device. In some embodiments, the information about the agent can be sent to the beneficiary's mobile communication device as an e-mail, a Short Message Service (SMS) communication, an instant message (IM), a Multimedia Messaging Service (MMS) communication, or by any other conventional electronic messaging techniques. In some embodiments, the information sent to the mobile communication device of the beneficiary may include the name, location, and contact information of the one or more agents. In some embodiments, the information sent to the beneficiary's mobile communication device may also include distance of each of the one or more agents from the beneficiary's current location and directions to the location of the one or more agents from the beneficiary's current location. In some embodiments, the transaction server may also send a portion of the funds transfer information, including the claim identification number, to the beneficiary's mobile communication device. In some embodiments, the agent information may be presented on the beneficiary's mobile communication device as a list in which the agents are ranked according to the priority assigned to them by the transaction server.

At step 710, the beneficiary can select an agent from the one or more agents communicated to his mobile communication device and communicate the selection of an agent to the transaction server. For example, after the beneficiary receives a list of agents from the transaction server via an e-mail, the beneficiary may select an agent number from the list and reply to the e-mail thus communicating selection of an agent to the transaction server. Once the transaction server receives the communication from the beneficiary's mobile communication device indicating selection of an agent, the transaction server may send the details of the funds transfer information to the selected agent at step 712. In some embodiments, the transaction server may also send the beneficiary details to the selected agent so that the selected agent now knows the identity of the beneficiary. In some embodiments, the transaction server may request a confirmation message from the selected agent indicating the agent is available to fulfill the funds transfer. In such an instance, the transaction server may send a confirmation message to the beneficiary's mobile communication device indicating that the selected agent is available and capable of completing the funds transfer. In some embodiments, after the transaction is completed, the agent and/or the beneficiary can send a confirmation message to the transaction server indicating successful completion of the funds transfer. The confirmation message may be relayed to the transmitting agent.

In some embodiments, if the selected agent is not available or is not capable of fulfilling the funds transfer, e.g., due to not having enough funds at hand, the selected agent can communicate with the transaction server indicating his inability to complete the funds transfer. Such a situation can arise when the agent database is not updated with most recent information or the information about agent location and/or funds at hand changes significantly between two update cycles. In such instances, the transaction server can communicate with the beneficiary's mobile communication device and request the beneficiary to choose a different agent. In some embodiments, after the beneficiary selects an agent, the transaction server may contact the selected agent to confirm that he is available to complete the funds transfer before sending any information to the selected agent at step 712. In this instance, only after the selected agent confirms his ability to fulfill the funds transfer request will the transaction server send the funds transfer details to the selected agent.

It should be appreciated that the specific steps illustrated in FIG. 7 provide a particular method of transferring funds according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, the funds transfer can be made by disbursing cash to the beneficiary. In other embodiments, the funds transfer can be made using a payment card such as, a prepaid debit card or a smart card. In some embodiments, the sender may specify the disbursement method. In some embodiments, the beneficiary may choose from among several disbursement methods offered by the selected agent.

Money Transfer Trust System Using Geo-Location

The other issue with mobile agents is the need to implement a process so that the beneficiary can locate and identify the correct mobile agent in a given location, e.g., a crowded market. This issue is more pronounced in situations where a sender wants to deposit money with a mobile agent, with the mobile agent acting as a transmitting agent. The sender needs to have the guarantee that the agent to whom he is giving the money is an authorized agent.

As described above, money transfer can be efficiently processed using determination of geo-location of the beneficiary and a receiving agent. This process can be made even more robust by adding an authentication and trust mechanism that will ensure the safe transfer of money from the selected agent to the beneficiary. This problem may be more acute in locations where the money transfer is done via individual agents who are mobile rather than at brick-and-mortar locations. For example, when the beneficiary receives information about a selected (receiving) agent that can fulfill the funds transfer request, there may be no way for the beneficiary to discern trusted physical agents from disreputable agents or non-agents. For example, the selected agent may be located at a crowded location, e.g., a bazaar. In such an instance, it may be very difficult for the beneficiary to locate the selected agent if all the beneficiary has is the agent's name. It is possible that a different person may impersonate the selected agent and perpetuate a fraud on the beneficiary.

Figure 8A:
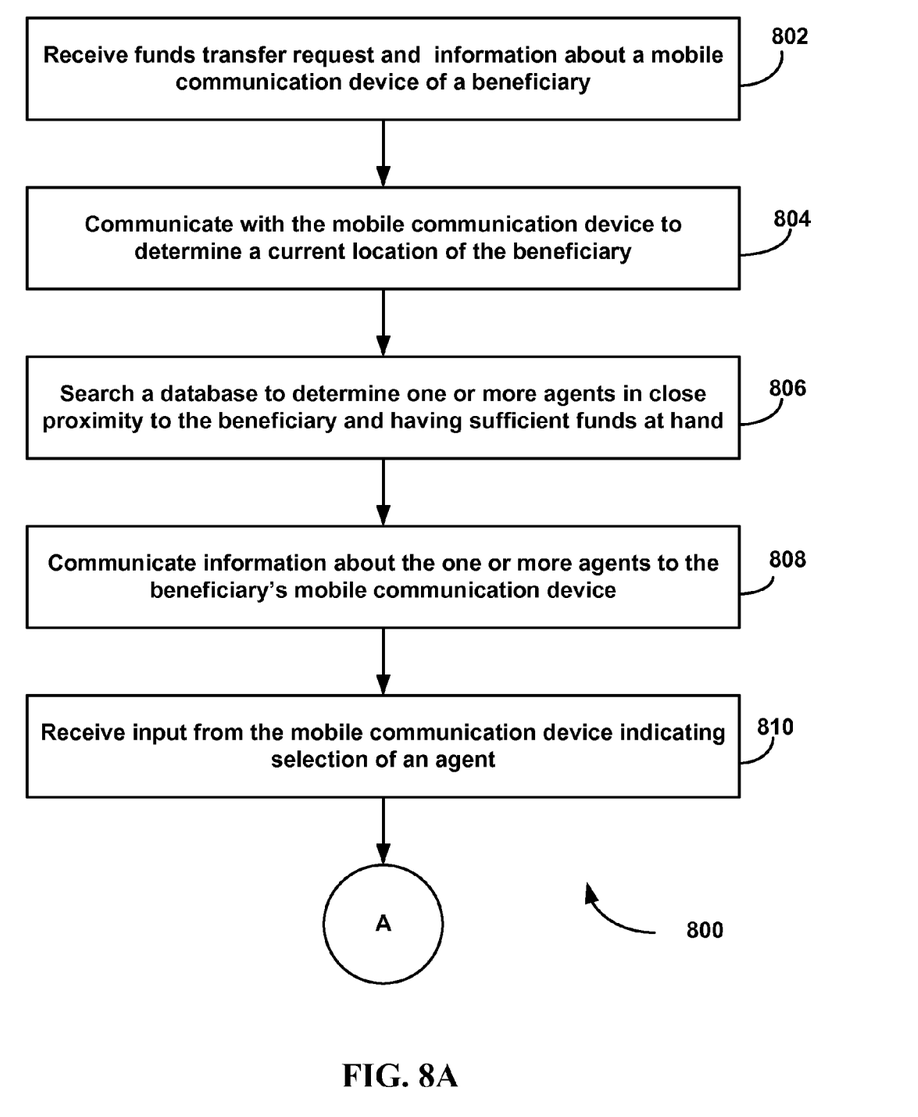
FIGS. 8A and 8B illustrate a flow diagram of a process for transferring funds between a sender and beneficiary according to another embodiment of the present invention.
Figure 8B:
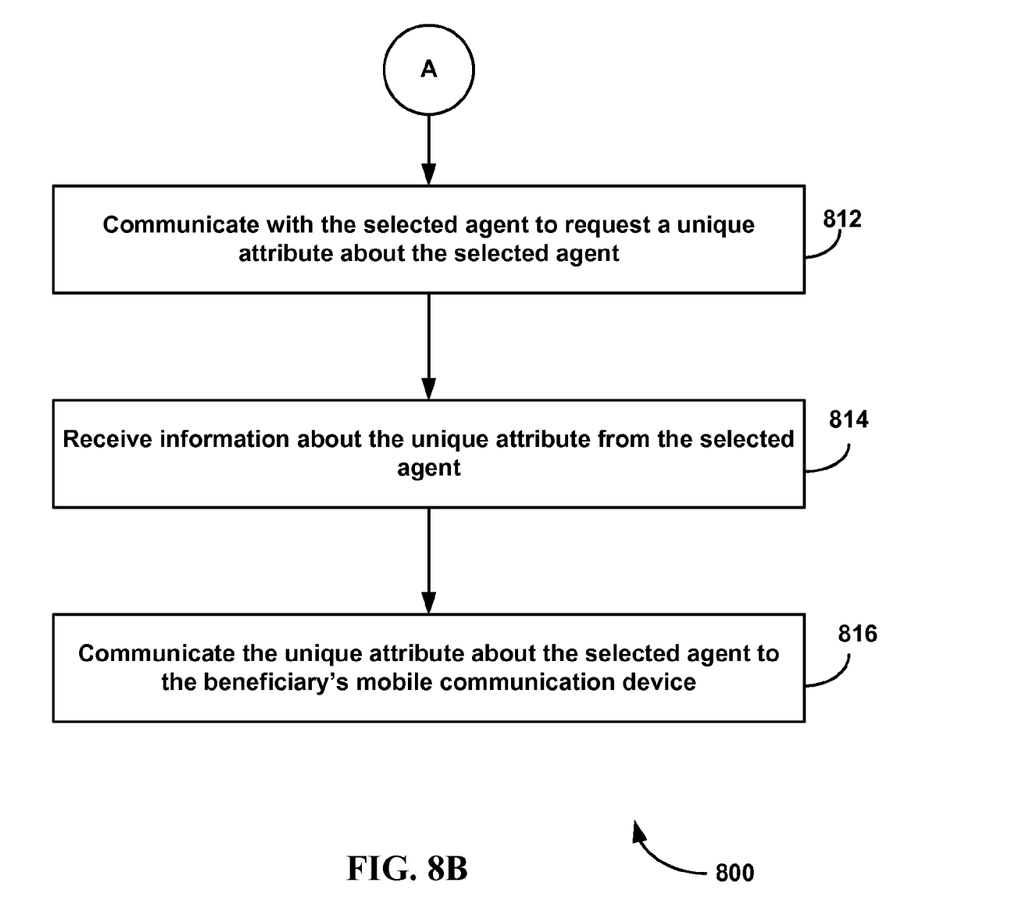

Embodiments of the present invention provide a method for establishing a trust system to securely conduct money transfer operation. FIGS. 8A and 8B illustrate a flow diagram of a process 800 for transferring funds according to another embodiment of the present invention. At step 802, the transaction server receives information about a funds transfer operation including details of a mobile communication device of the beneficiary. At step 804, the transaction server contacts the beneficiary's mobile communication device and determines the beneficiary's location using any of techniques described above. At step 806, the transaction server determines one or more receiving agents that are close to the beneficiary using the information in the agent database as described above, e.g., in relation to FIG. 7.

At step 808, the information of the receiving agent(s) is sent to the beneficiary's mobile communication device. At step 810, the beneficiary selects one receiving agent from among the list of one or more receiving agents sent to his mobile communication device and sends the indication of the selected receiving agent to the transaction server.

At step 812, the transaction server contacts the selected agent, e.g., via the selected agent's mobile communication device, and requests information about a unique attribute of the agent. The unique attribute may include a password or passphrase, a challenge question and an answer, a physical attribute, e.g., the agent is wearing a Red Manchester United jersey, or a location attribute, e.g., the agent is standing near a landmark or the agent is at a seller booth with the MTN telecom banner. At step 814, the transaction server receives information about the unique attribute associated with the selected receiving agent. At step 816, the unique attribute information about the selected receiving agent is sent to the beneficiary's mobile communication device. The beneficiary may then use the attribute information in conjunction with the geo-location information to locate the selected receiving agent and complete the funds transfer process. More generally, the unique attribute is any information that can serve to identify or verify identity of the receiving agent, including passwords or other spoken challenge/response sequences, physical description of the receiving agent, location, time of location, description of location, and so on, and combinations of the foregoing.

As described above, the funds may be disbursed to the beneficiary as cash or in form of a payment card such as, a prepaid debit or smart card. In some embodiments, the funds may be disbursed in the form of cellular airtime minutes to the beneficiary. In still other embodiments, the receiving agent may be directed to deposit the funds in a designated account of the beneficiary that may be separate from the payment card. This may help to further ensure that the beneficiary receives the funds and eliminate the usual disadvantages of a cash disbursement like loss or theft. In addition, depositing funds in an account can provide better tracking of the funds for the benefit of the sender as well as the beneficiary.

It should be appreciated that the specific steps illustrated in FIGS. 8A and 8B provide a particular method of transferring funds according to an embodiment of the present invention. Other sequences of steps may also be performed according to alternative embodiments. For example, alternative embodiments of the present invention may perform the steps outlined above in a different order. Moreover, the individual steps illustrated in FIGS. 8A and 8B may include multiple substeps that may be performed in various sequences as appropriate to the individual step. For instance, instead of giving the beneficiary a choice of receiving agents, the transaction server may choose a receiving agent based on the above-mentioned criteria and automatically request attribute information from that agent. In this instance, steps 808 and 810 can be eliminated. Furthermore, additional steps may be added or removed depending on the particular applications. One of ordinary skill in the art would recognize many variations, modifications, and alternatives.

In some embodiments, the process described in FIGS. 8A and 8B can also be implemented in situations where the receiving agent is also a transmitting agent.

Figure 9:
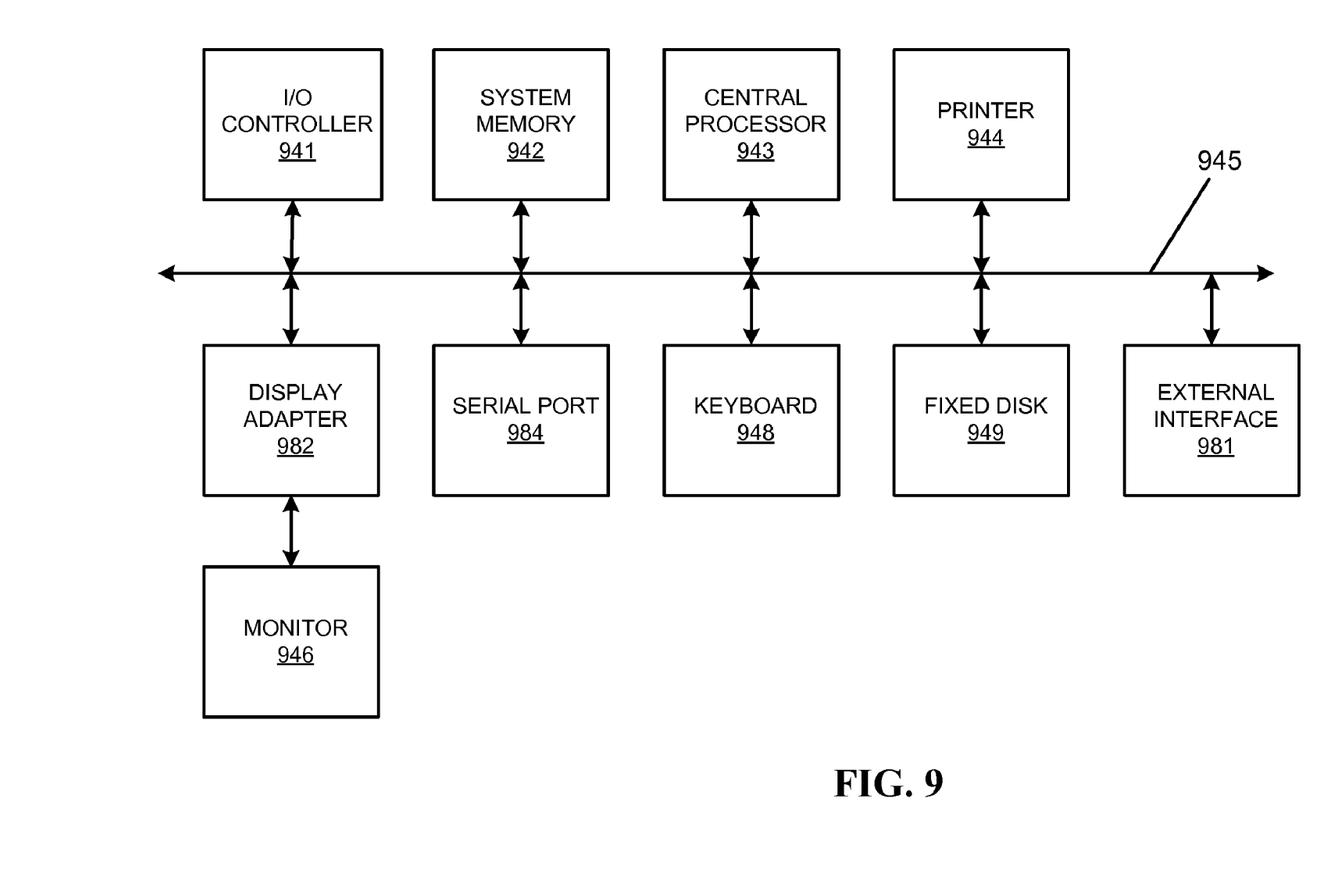
FIG. 9 is a high level block diagram of a computer system according to an embodiment of the present invention.

Embodiments of the present invention can be realized by dedicated hardware and software. FIG. 9 is a high level block diagram of a computer system that may be used to implement the transaction server 300 described above and may include one or more of the subsystems or components shown in FIG. 9, which is a block diagram of a computer apparatus. The subsystems shown in FIG. 9 are interconnected via a system bus 945. Additional subsystems such as printer 944, keyboard 948, fixed disk 949, monitor 946, which is coupled to display adapter 982, and others are shown. Peripherals and input/output (I/O) devices, which couple to I/O controller 941, can be connected to the computer system by any number of means known in the art, such as serial port 984. For example, serial port 984 or external interface 981 can be used to connect the computer apparatus to a wide area network such as the Internet, a mouse input device, or a scanner. The interconnection via system bus 945 allows central processor 943 to communicate with each subsystem and to control the execution of instructions from system memory 942 or fixed disk 949, as well as the exchange of information between subsystems. The system memory 942 and/or fixed disk 949 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

It should be noted that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for transferring funds, the method comprising:
   receiving, by a transaction processor computer, information about a beneficiary's mobile device and information about a funds transfer operation, the information about the funds transfer operation including a claim identification (ID) number;
   contacting, by the transaction processor computer, the beneficiary's mobile device to determine a location of the beneficiary;
   determining, by the transaction processor computer, a first plurality of mobile agents, from a second plurality of mobile agents, who can fulfill the funds transfer operation based at least in part on the location of the beneficiary, wherein the determining comprises:
      communicating, by the transaction processor computer, with mobile devices of the second plurality of mobile agents to determine a current location for each of the second plurality of mobile agents, wherein the current location information for the second plurality of agents is provided in an agent database; and
      comparing, by the transaction processor computer, the location of the beneficiary to the current location of each of the second plurality of mobile agents to determine the first plurality of mobile agents closest to the location of the beneficiary;
   sending, by the transaction processor computer, information about the first plurality of mobile agents to the beneficiary's mobile device;
   receiving, by the transaction processor computer, input from the beneficiary's mobile device, the input indicating selection of a mobile agent from the first plurality of mobile agents; and
   sending, by the transaction processor computer, a message to the mobile device of the selected mobile agent, the message including the claim information and the information about the beneficiary.

2. The method of claim 1 wherein receiving contacting beneficiary's mobile device includes sending a query to the beneficiary's mobile device requesting current coordinates of the mobile device.

3. The method of claim 1 wherein the location of the beneficiary is determined using a global positioning system (GPS) signal or by using cellular phone tower triangulation technique.

4. The method of claim 1 further comprising:
   periodically contacting the mobile communication device associated with each of the second plurality of mobile agents to determine their current location and information about available funds at hand; and
   updating the agent database with the current location of each of the second plurality of mobile agents and information about available funds at hand for each of the plurality of mobile agents.

5. The method of claim 1 wherein determining the first plurality of mobile agents who can fulfill the claim includes:
   determining one or agents whose location is closest to the location of the beneficiary; and
   determining that the first plurality of agents have enough funds at hand to fulfill the claim.

6. A method for transferring money to a beneficiary, the method comprising:
   receiving, by a computer system, information about a beneficiary, the information including information about a first mobile communication device of the beneficiary;
   contacting, by the computer system, the first mobile communication device to request a current location of the first mobile communication device;
   receiving, by the computer system, the current location of the first mobile communication device;
   determining, by the computer system, location of each of a first plurality of mobile agents based on location information provided by a mobile device associated with each of the first plurality of mobile agents;
   selecting by the computer system, a second plurality of mobile agents based at least on the current location of the first mobile communication device and the location of the first plurality of mobile agents;
   communicating, by the computer system, the information about the selected second plurality of mobile agents to the first mobile communication device;
   receiving, by the computer system, input from the first mobile communication device, the input indicating selection of an mobile agent, by the beneficiary, from among the selected second plurality of mobile agents; and
   communicating, by the computer system, payment information to the selected mobile agent, the payment information including a claim number and an amount of payment.

7. The method of claim 6 wherein selecting the second plurality of mobile agents further includes:
   determining, by the computer system, that the second plurality of mobile agents have enough funds on hand to complete the money transfer.

8. The method of claim 7 wherein the determining includes querying a database, wherein the database includes:
   identifying information for each of the first plurality of mobile agents;
   location information for each of the first plurality of mobile agents; and
   information about total funds available at each of the first plurality of mobile agents.

9. The method of claim 6 wherein contacting the first mobile communication device to request a current location includes:
   sending a request to the first mobile communication device to share its current geo-location; and
   receiving information from the first mobile communication device indicating the current geo-location of the mobile communication device.

10. The method of claim 9 wherein the current geo-location is the GPS coordinates of the first mobile communication device.

11. The method of claim 9 wherein the current geo-location is determined using cellular tower triangulation.

12. The method of claim 6 further comprising:
   receiving, by the computer system, input from the mobile device of the selected mobile agent, the input indicating completion of money transfer to the beneficiary.

13. The method of claim 12 wherein the money transfer to the beneficiary is accomplished by one of disbursing cash or issuing a payment card.

14. A system for transferring funds to a beneficiary, the system comprising:
   a transmitting agent computer configured to:
      receive beneficiary information including information about a mobile communication device of the beneficiary;

receive information about funds to be transferred from a sender; and generate a claim identification number, wherein the claim identification number corresponds to a funds transfer operation;

and a transaction server computer configured to:
receive, from the transmitting agent computer, information about the mobile communication device of the beneficiary, information about funds to be transferred, and the claim identification number;
communicate with the mobile communication device of the beneficiary to determine a current location of the beneficiary;
select a plurality of mobile receiving agents, from an agent database, who can fulfill the funds transfer to the beneficiary, based at least in part on a current location of the plurality of mobile receiving agents, the current location of the plurality of mobile receiving agents being provided by a mobile device associated with each of the plurality of mobile receiving agents;
send the information about the plurality of mobile receiving agents to the mobile communication device of the beneficiary;
receive input from the mobile communication device of the beneficiary, the input indicating selection of a mobile receiving agent, from among the plurality of mobile receiving agents, by the beneficiary; and
send the beneficiary information and the claim identification number to the mobile device of the selected mobile receiving agent.

15. The system of claim 14 wherein the transaction server is further configured to receive input from the mobile device of the mobile receiving agent indicating completion of the funds transfer operation.

16. The system of claim 14 wherein the mobile receiving agent is further configured to disburse the funds to the beneficiary in the form of cash, a payment card, cellular airtime, or direct deposit to a designated account.

17. The system of claim 14 wherein the transaction server is further configured to determine the current location of the beneficiary by requesting a current geo-location of the mobile communication device of the beneficiary.

18. The system of claim 17 wherein the current geo-location of the mobile communication device of the beneficiary is determined using one of global positioning system (GPS) coordinates or cellular phone tower triangulation technique.

19. A method for transferring funds to a beneficiary, the method comprising:

receiving, by a transaction server computer, information about funds to be transferred and information about a mobile communication device of the beneficiary;
communicating, by the transaction server computer, with the mobile communication device of the beneficiary to request a current geo-location of the beneficiary;
selecting, by the transaction server computer, a mobile receiving agent, from among a plurality of mobile receiving agents, to provide the funds to the beneficiary based at least in part on the current geo-location of the beneficiary, wherein the selecting comprises
determining, by the transaction server computer, a current location of the plurality of mobile receiving agents based on location information provided by a mobile device of each of the plurality of mobile receiving agents;
determining, by the transaction server computer, the funds at hand for each of the plurality of mobile receiving agents; and
selecting, by the transaction server computer, the mobile receiving agent (a) whose current location is closest to the current geo-location of the beneficiary and (b) who has sufficient funds at hand to compete the funds transfer
communicating, by the transaction server computer, with the mobile device of the selected mobile receiving agent to request an attribute associated with the selected mobile receiving agent;
receiving, by the transaction server computer, from the mobile device of the selected mobile receiving agent, the attribute; and
communicating, by the transaction server computer, the attribute associated with the selected mobile receiving agent to the mobile communication device of the beneficiary.

20. The method of claim 19 wherein the attribute includes one of a physical attribute of the mobile receiving agent, location attribute, a password, or a challenge-response.

21. The method of claim 19 wherein selecting the mobile receiving agent further comprises:
searching a database to: (a) determine a current location of the plurality of mobile receiving agents and (b) determine the funds at hand for each of the plurality of mobile receiving agents.

22. The method of claim 19 wherein the mobile communication device of the beneficiary determines its geo-location based on a global positioning system (GPS) signal, by using cellular phone tower triangulation technique, or based on wireless access points in the vicinity.

* * * * *